(12) United States Patent
Kokkoneva et al.

(10) Patent No.: US 9,127,969 B2
(45) Date of Patent: Sep. 8, 2015

(54) APPARATUS FOR PEDALLING MEASUREMENT ARRANGEMENT

(71) Applicant: Polar Electro Oy, Kempele (FI)

(72) Inventors: Olli Kokkoneva, Oulu (FI); Visa Rauta, Oulu (FI)

(73) Assignee: POLAR ELECTRO OY, Kempele (FI)

( * ) Notice: Subject to any disclaimer, the term of this patent is extended or adjusted under 35 U.S.C. 154(b) by 114 days.

(21) Appl. No.: 14/054,387

(22) Filed: Oct. 15, 2013

(65) Prior Publication Data

US 2014/0033818 A1 Feb. 6, 2014

Related U.S. Application Data

(63) Continuation of application No. 13/030,553, filed on Feb. 18, 2011, now Pat. No. 8,584,520.

(51) Int. Cl.
  *G01D 11/24* (2006.01)
  *B62M 3/08* (2006.01)

(52) U.S. Cl.
  CPC .............. *G01D 11/245* (2013.01); *B62M 3/08* (2013.01); *G01D 11/24* (2013.01)

(58) Field of Classification Search
  CPC ................................. G01D 11/24; B62M 3/08
  USPC ............................................................ 73/431
  See application file for complete search history.

(56) References Cited

U.S. PATENT DOCUMENTS

| 6,205,885 | B1 | 3/2001 | Hermansen et al. | |
| 6,227,071 | B1 * | 5/2001 | Coombe | 74/594.4 |
| 8,011,242 | B2 * | 9/2011 | O'Neill et al. | 73/379.01 |
| 8,327,723 | B2 * | 12/2012 | Roudergues et al. | 73/862.51 |
| 8,387,470 | B2 * | 3/2013 | Tuulari et al. | 73/862.627 |
| 2002/0108466 | A1 * | 8/2002 | Campagnolo | 74/594.4 |
| 2010/0024590 | A1 * | 2/2010 | O'Neill et al. | 74/594.1 |
| 2014/0001728 | A1 * | 1/2014 | Hilfiker et al. | 280/259 |
| 2014/0273543 | A1 * | 9/2014 | Hanshew | 439/18 |

OTHER PUBLICATIONS

DJ Connel, "Metrigear Pedal Spindle-Based Weenie-Compatible Power Meter", Sep. 18, 2009, http://weightweenies.starbike.com/forum/viewtopic.php?t=62804, p. 1.
James Huang, "Eurobike 2010: Look and Polar Launch Keo Power Pedal", Sep. 9, 2010 according to Waybackmachine, http://www.bikeradar.com/news/article/eurobike-2010-look-and-polar-launch-keo-power-pedal-27618/, pp. 1-3.

* cited by examiner

*Primary Examiner* — Lisa Caputo
*Assistant Examiner* — Jamel Williams
(74) *Attorney, Agent, or Firm* — Hoffmann & Baron, LLP

(57) ABSTRACT

An apparatus for pedaling measurement is presented. The apparatus comprises a casing arranged to be attached to a crank of a cycle. The casing comprises a signal processing circuitry configured to process a measurement signal related to pedaling. The casing further comprises a protrusion arranged to be disposed at least partially into a hole of a spindle of a pedal, wherein the protrusion provides the apparatus with a mechanic support with respect to the spindle and an electric connection between the signal processing circuitry and a measurement circuitry comprised in the spindle. Furthermore, there is provided a cycling apparatus comprising the above-mentioned apparatus.

11 Claims, 4 Drawing Sheets

APPARATUS FOR PEDALLING MEASUREMENT ARRANGEMENT

CROSS REFERENCE TO RELATED APPLICATION

This application is a continuation of U.S. patent application Ser. No. 13/030,553 filed on Feb. 18, 2011, which is incorporated herein by reference in its entirety.

BACKGROUND

1. Field

The invention relates to an apparatus for use when measuring properties related to pedaling.

2. Description of the Related Art

Pedaling measurement refers to measuring various parameters from pedaling action. The measurement may be utilized in various products relating to sports, exercise, medicine, bicycles, or exercise cycles, for example.

SUMMARY

According to an aspect of the present invention, there is provided an apparatus for use in pedaling measurement, the apparatus comprising: a casing arranged to be attached to a crank of a cycle apparatus, comprising a signal processing circuitry configured to process a measurement signal related to pedaling, wherein the casing further comprises a protrusion arranged to be disposed at least partially into a hole of a spindle of a pedal, wherein the protrusion provides the apparatus with a mechanic support with respect to the spindle and an electric connection between the signal processing circuitry and a measurement circuitry comprised in the spindle.

According to another aspect, there is providing a cycle apparatus comprising an apparatus for use in pedaling measurement, the apparatus comprising: a casing arranged to be attached to a crank of a cycle apparatus, comprising a signal processing circuitry configured to process a measurement signal related to pedaling, wherein the casing further comprises a protrusion arranged to be disposed at least partially into a hole of a spindle of a pedal, wherein the protrusion provides the apparatus with a mechanic support with respect to the spindle and an electric connection between the signal processing circuitry and a measurement circuitry comprised in the spindle.

Embodiments are defined in the dependent claims.

BRIEF DESCRIPTION OF THE DRAWINGS

Embodiments of the present invention are described below, by way of example only, with reference to the accompanying drawings, in which.

DETAILED DESCRIPTION

The following embodiments are exemplary. Although the specification may refer to "an" embodiment in several locations, this does not necessarily mean that each such reference is to the same embodiment(s), or that the feature only applies to a single embodiment. Single features of different embodiments may also be combined to provide other embodiments.

Figure 1:
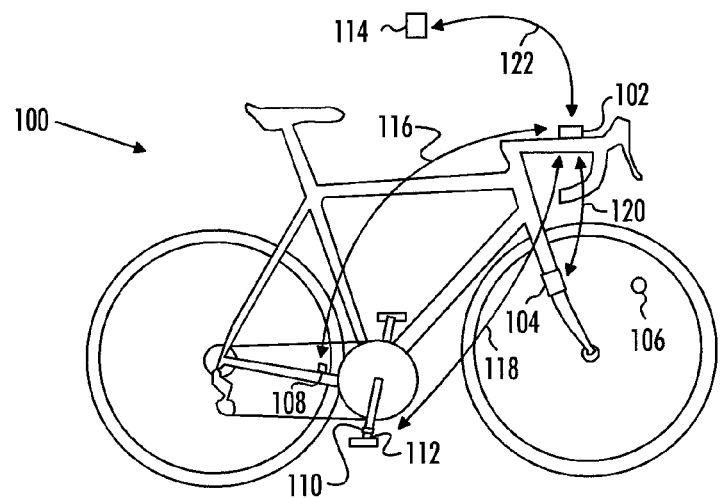
FIG. 1 illustrates a cycling apparatus to which embodiments of the invention may be applied.

With reference to FIGS. 1 to 13, various embodiments of an apparatus 112 are described. The apparatus 112 may be a module used in a measurement system used for measuring pedaling characteristics. FIG. 1 illustrates an embodiment where the apparatus 112 co-operates with a cycling computer system 100. At the time of filing this patent application, such a cycling computer system 100 may be implemented based on a Polar CS500 with a power sensor, for example. The implementation of the embodiments in such an existing product requires relatively small and well-defined modifications. Naturally, as the products evolve, feasible platforms for the implementation of the embodiments described in this patent application also evolve and emerge.

The system 100 may comprise a handlebar-mounted central unit 102. The central unit 102 may be a bike computer, a mobile phone, or a wrist computer, for example. A user interface run in the central unit 102 may show various cycling-related parameters, such as elapsed time, speed, distance, elevation, cadence, pedaling force, pedaling power or route information etc. The user interface may comprise a display, means for producing sound, a keyboard, and/or a keypad. The display may be a liquid crystal display, for example, but it may also be implemented by any appropriate technique. The means for producing sound may be a loudspeaker or a simpler means for producing beeps or other sound signals. The keyboard/keypad comprises a complete qwerty keyboard, a mere numeric keypad or only a few push buttons and/or rotary buttons. In addition, the user interface may comprise other prior art user interface elements, for example various means for focusing a cursor (mouse, track ball, various arrow keys, etc.) or elements enabling audio control.

Furthermore, the central unit 102 may output information relating to the measured characteristics. The measured characteristic may be strain measured from a pedal with a strain gauge, for example, and transformed into pedaling action information, such as information on pedaling power, pedaling efficiency, left/right (crank) balance, and pedaling index. The outputted information may also relate to some other pedaling parameter, such as a scalar pedaling force, a tangential pedaling force, a radial pedaling force, a pedaling force distribution along pedaling angle, a maximum force, an average force etc. The apparatus 112 may obtain a measured strain data from the strain gauge and transmit the measured strain data, or further refined pedaling effort signal, using a wireless connection 118 to the central unit 102.

The apparatus 112 may comprise a wireless transmitter for transmitting the information to the central unit 102. The transmitter may operate according to a suitable proximity communication, i.e. with a communication technology that takes place over relatively small distances. A suitable range may vary from 0.5 to 1.5 meters. Longer ranges (such as ten meters) may also be applied. The range may be such that it encompasses typical communication path lengths within a bicycle. The proximity communication may be implemented with an induction-based technology utilizing a magnetic field, or a radio-based technology utilizing electric radiation, for example. It is to be noted that both technologies involve both the magnetic field and the electric radiation, but the separation is based on the fact that either one of these physical phenomena predominates and is used for communication in each technology. The induction-based transmission may operate at a kilohertz range frequency (5 kilohertz, 125 kilohertz, or over 200 kilohertz, for example). The radio transmission may utilize a proprietary transceiver (operating at a 2.4 gigahertz frequency, for example), or a Bluetooth transceiver, for example. Emerging ultra low power Bluetooth technology may also be used. Other suitable proximity communication techniques may include techniques based on light or sound, such as infrared communication or sonic communication. The proximity communication may utilize any suitable protocols: the principles of time division and/or packet transmission, for example. The transmitter may be an induction-based transmitter, such as a kilohertz-range transmitter, a passive radio-frequency identification tag, a coil-based inductive communication unit, or a near field communication transmitter, for example. The radio transmission may also operate according to some WLAN (Wireless Local Area Network) standard.

Additionally, or alternatively, the apparatus 112 may comprise a processor configured to form a pedaling parameter by using the elastic strain. The term 'processor' refers to a device that is capable of processing data. The processor may comprise an electronic circuit implementing the required functionality, and/or a microprocessor running a computer program implementing the required functionality. When designing the implementation, a person skilled in the art will consider the requirements set for the size and power consumption of the apparatus, the necessary processing capacity, production costs, and production volumes, for example.

The electronic circuit may comprise logic components, standard integrated circuits, application-specific integrated circuits (ASIC), and/or other suitable electronic structures.

The microprocessor implements functions of a central processing unit (CPU) on an integrated circuit. The CPU is a logic machine executing a computer program, which comprises program instructions. The program instructions may be coded as a computer program using a programming language, which may be a high-level programming language, such as C, or Java, or a low-level programming language, such as a machine language or assembly language. The CPU may comprise a set of registers, an arithmetic logic unit (ALU), and a control unit. The control unit is controlled by a sequence of program instructions transferred to the CPU from a program memory. The control unit may contain a number of microinstructions for basic operations. The implementation of the microinstructions may vary, depending on the CPU design. The microprocessor may also have an operating system (a dedicated operating system of an embedded system, or a real-time operating system), which may provide the computer program with system services.

The apparatus 112 may also comprise an output device for outputting information to the user. Besides the wireless transmitter, the output device may be a device interface (with which another apparatus may interact by exchanging data with the apparatus 112), a display, or some other means to visually (or even in another manner such as by sound) output data. The other means to visually output data may be a LED (Light Emitting Diode) or the like, and the visual output may be expressed by the colour of the LED (there may be more than one LED, each having own colour) or the blinking frequency of the LED, for example.

The system 100 may also comprise a speed measuring unit 104, 106. The speed measuring unit may comprise two parts, a speed detector 104, and a speed inductor 106. This may be implemented in such a manner that a wheel speed sensor 104 is placed on the right fork, and a wheel speed magnet 106 is placed on a spoke (for the sake of clarity, spokes are not illustrated in FIG. 1). Speed information is obtained from the wheel speed sensor 104 as the wheel speed magnet 106 passes it. The speed detector 104 may transmit the wireless speed signal 120 to the central unit 102.

The system 100 may also comprise a cadence measuring system 108, 110. The cadence measuring system 100 may comprise two parts, a cadence detector 108, and a cadence inductor 110. This may be implemented in such a manner that a cadence magnet 110 is placed on the right crank, and the crank speed detector 108 is mounted on the right chain stay. Cadence information is obtained from crank speed detector 108 as the cadence magnet 110 passes it. The cadence detector 108 may transmit the wireless cadence signal 116 to the central unit 102.

The system 100 may also comprise a heart activity measurement unit 114. The heart activity measurement unit 114 may be strapped around the chest of the cyclist, for example. The heart activity measurement unit 114 may produce heart activity information, such as a heart rate. The heart activity measurement unit 114 may transmit the wireless heart activity signal 122 to the central unit 102.

Figure 2:
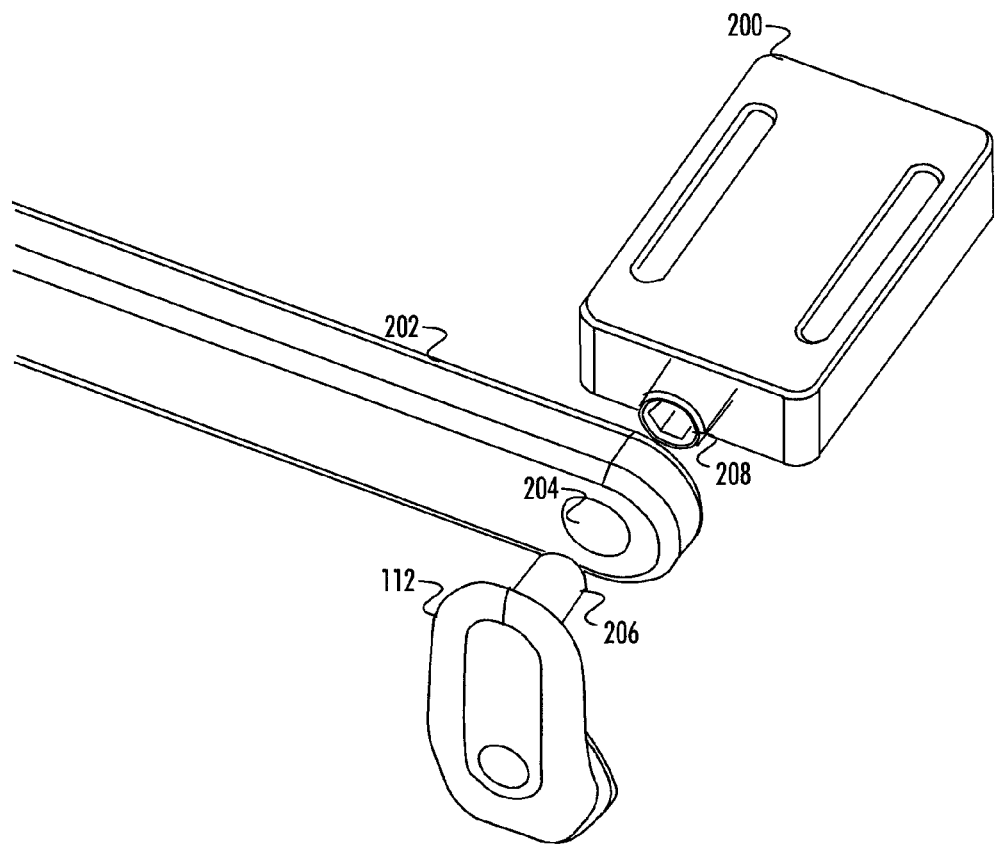
FIGS. 2 to 8 illustrate various embodiments of an apparatus for pedaling measurements.

Referring to FIG. 2, the apparatus 112 for use in pedaling measurement according to an embodiment of the invention comprises a casing arranged to be attached to a crank 202 of a cycle. The casing houses a signal processing circuitry configured to process a measurement signal related to the pedaling. The casing comprises a protrusion 206 arranged to be disposed through a spindle hole 204 of the crank 202 and connect to a spindle 208 of a pedal 200. The protrusion 206 may function as a counterpart to the spindle 208 and, thus, provide the spindle with mechanic support. The signal processing circuitry of the apparatus is connected to a measurement circuitry disposed in the spindle via at least one electric connector comprised in the protrusion. Thus, the apparatus provides also electric connection between the signal processing circuitry and the measurement circuitry comprised in the spindle 208.

'Pedal' normally refers to a component of a bicycle drivetrain, which converts the reciprocating motion of the rider's legs into rotational motion used to drive a chain (or even a belt or some other force transmission means), which in turn drives a wheel of the bicycle. However, within this patent application, besides referring to foot pedals, 'pedal' also refers to hand pedals as the apparatus is equally capable of measuring action by hand pedals. Furthermore, besides bicycle, the pedal 200 may belong to any human-powered vehicle, such as a unicycle, a tricycle, a quadricycle, a recumbent, a stationary exercise-bike, pedelecs (pedal electric bikes) etc. The spindle is defined as an axle of the pedal allowing the pedal to rotate. The spindle may house bearings etc. for such a purpose and means for mechanically attaching the pedal to the crank, e.g. threading on an outer surface of the spindle to match with a threading on an internal surface of the spindle hole 204 in the crank.

There are two cranks 202, one on each side of a crankset, usually mounted 180° out of phase. The crankset comprises, besides the two cranks 202, one or more sprockets (also known as chainrings or chainwheels). The crankset connects to the rider by the pedals 200, to the bicycle frame by the bottom bracket, and to the rear sprocket via the chain, as illustrated in FIG. 1.

Figure 3:
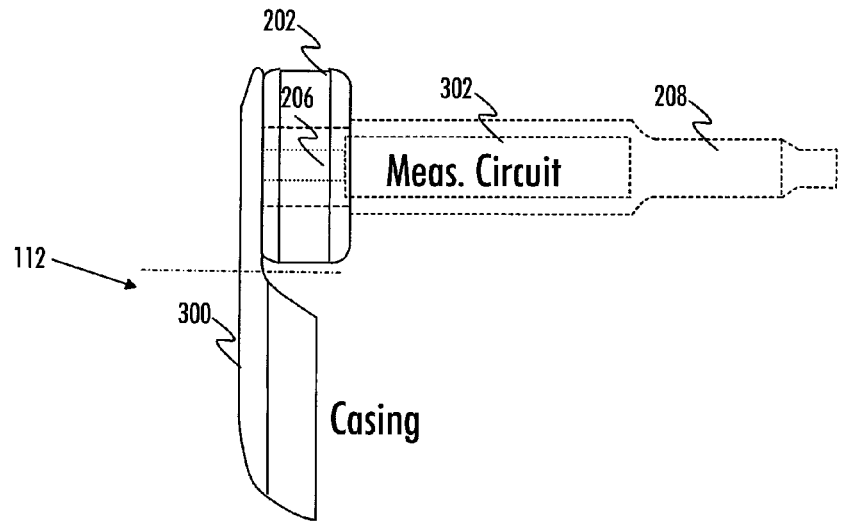

FIG. 3 illustrates in a cross-sectional view the interconnection between the apparatus 112 and the spindle 208 when they are attached to the crank 202. As mentioned above, the spindle 208 comprises a measurement circuitry 302 comprising a strain gauge sensor and/or another sensor configured to measure a pedaling property and generate an electric signal relative to the measured property. In some embodiments, the measurement circuitry 302 comprises other components configured to process the measured signal, e.g. an amplifier, a filter, and an analog-to-digital converter. Referring to FIG. 3, the spindle 208 is attached to the crank 202 by inserting it into a spindle hole of the crank 202. When a protrusion of the spindle 208 has an outer threading and the spindle hole has inner threading, the spindle 208 may be screwed into the spindle hole to fix it firmly. The spindle 208 may be inserted to the spindle hole from one side of the crank 202, typically the outer side with respect to the cycle body. The apparatus 112 may be attached to the spindle 208 from the other side of the crank 202, namely the inner side with respect to the cycle body. The protrusion 206 of the apparatus 112 is inserted into the spindle hole of the crank 202 and to a hole comprised at the end of the spindle 208 which allows the protrusion 206 to connect to the spindle 208 mechanically when the protrusion 206 is inserted into the spindle hole of the crank 202 and into the hole at the end of the spindle 208. Accordingly, at least a portion of the protrusion 206 connects mechanically to the spindle 208 such that the protrusion 206 provides the apparatus 112 with mechanical support with respect to the spindle 208. The protrusion 206 may provide the mechanical support in a plane perpendicular to the longitudinal axis of the protrusion 206, thereby fixing the apparatus 112 laterally with respect to the crank 202 and the spindle 208. The apparatus 112 may further be attached to the crank 202 with a cable tie or another strap that surrounds the apparatus 112 and the crank 202, thereby tying the apparatus to the crank 202 and providing the apparatus 112 with the mechanical support in the direction of the longitudinal axis of the protrusion 206, as will be described in greater detail below.

Figure 4:
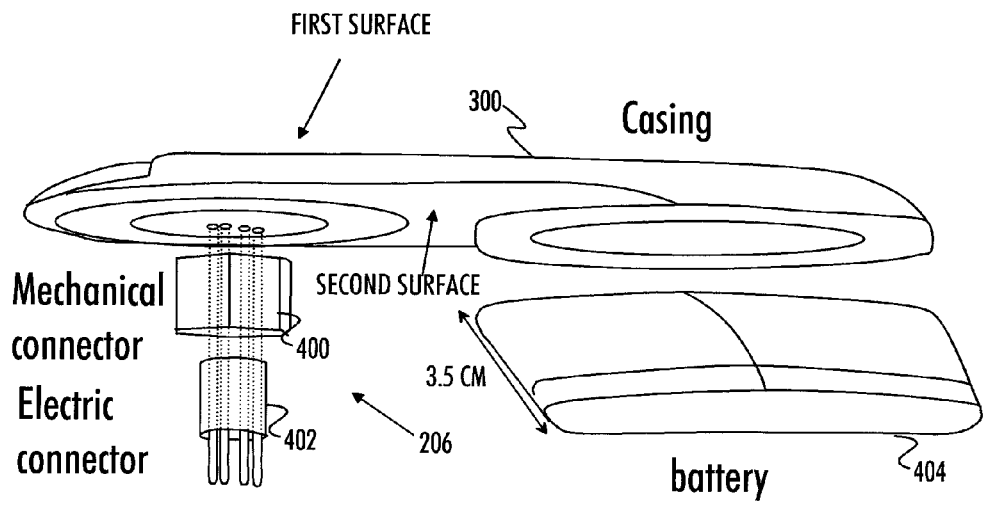
Figure 9:
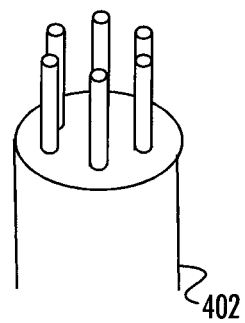
FIGS. 9 and 10 illustrate embodiments of an electric connector of the apparatus.
Figure 10:
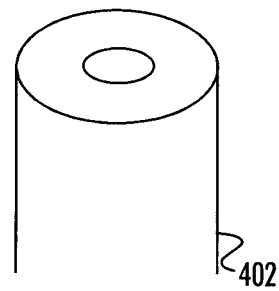
Figure 11:
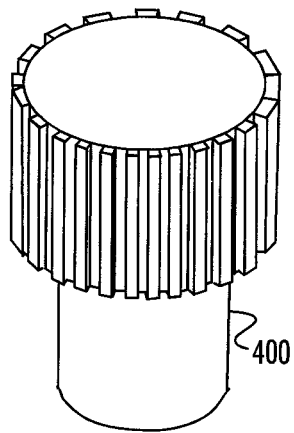
FIGS. 11 to 13 illustrate embodiments of a mechanic connector of the apparatus.
Figure 12:
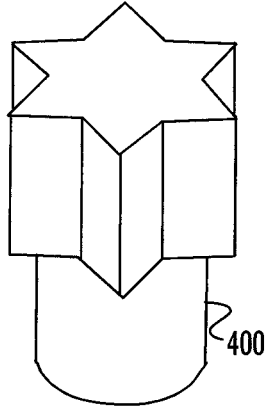
Figure 13:
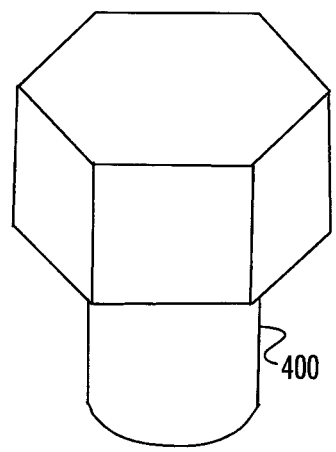

Let us now describe the structure of the apparatus 112 in greater detail with reference to FIGS. 4 to 13. Referring to FIG. 4 illustrating an explosion view of the apparatus 112, the apparatus 112 comprises a casing 300 which may have a substantially flat structure having a length in the order of 7 cm (see FIG. 5), width 3 to 4 cm (3.5 cm in FIG. 4), and thickness less than 5 mm in the thinnest portion (3 mm in FIG. 5) and 1 to 2 cm in the thickest portion (1.2 cm in FIG. 5). The casing 300 may be made of rigid plastic material. The casing 300 may have a first surface (top side in FIG. 4) which is substantially flat and arranged to face the chain or the cycle body when the apparatus 112 is installed to the crank 202. The casing 300 may have a second surface (bottom side in FIG. 4) which is opposite to the first surface, at least partially flat, and extended by a battery compartment 404 installed on the second surface, thereby providing the second surface with an irregular, non-flat shape. The battery compartment 404 may comprise a battery to provide the signal processing circuitry with power supply. The battery compartment 404 may be integrated into the second surface of the casing 300, or it may be detachably attached to it in order to enable battery replacement. As a consequence, the battery compartment 404 extends the second surface of the casing 300 towards the direction of the crank 202 (away from the chain and the bicycle body) when installed into the crank 202. As the battery compartment 404 is typically large in its size with respect to the other components of the apparatus 112, such an arrangement enables the casing 300 to extend in a direction away from the chains, which prevents the casing from coming into contact with the chains or other parts of the bicycle during cycling. The second surface of the casing 300 may also comprise housing for the protrusion 206, and the protrusion 206 may be integrated to the casing 300 and, thus, to the apparatus 112. The protrusion 206 may comprise a mechanical connector 400 to provide the spindle 208 with the mechanical support and an electric connector 402 to provide the apparatus 112 with the electric connection with the measurement circuitry of the spindle. The mechanical connector 400 may have a non-circular cross section which is arranged through its form to prevent a counterpart portion of the spindle placed in contact with the mechanical connector 400 from revolving around the mechanical connector 400 (or vice versa the apparatus revolving in the hole of the spindle). FIGS. 11 to 13 illustrate embodiments of the mechanical connector 400. The cross-section of the mechanical connector 400 may have a shape of a polygon, e.g. a hexagon as in FIG. 13, a star as in FIG. 12, or a cogwheel as in FIG. 11. Even a circular cross-section may be used in some embodiments where the surface of the mechanical connector is a high-friction surface providing the spindle with the mechanical support through mutual friction. The high-friction may be realized by proper selection of the material of the mechanical connector 400. Naturally, the embodiments of the mechanical connector 400 may be combined, e.g. to provide a mechanical connector with a non-circular cross-section with the high-friction surface. Such a high-friction surface may be designed to be watertight, thus preventing the water from entering the spindle and the measurement circuitry and other components inside the spindle.

The mechanical connector 400 may be disposed at a base of the protrusion 206, while the electric connector 402 extends beyond the mechanical connector 400 to connect to the measurement circuitry inside the spindle 208. The electric connector 402 and the mechanical connector 400 may form an integral entity which is integrated to the casing 300, as already mentioned. This provides for a watertight and durable structure. FIGS. 9 and 10 illustrate embodiments of the electric connector 402. FIG. 9 illustrates an embodiment for analog measurement, and the electric connector 402 may comprise a plurality of signal wire pins including, for example, a power wire pin, a ground wire pin, and at least one measurement signal wire pin. The pins may be springy in their longitudinal direction such that they withdraw inside the protrusion when pressed. This ensures that all the pins connect to their counterparts even though the apparatus is not inserted into the spindle hole optimally. FIG. 10 illustrates an embodiment for digital measurement, wherein the electric connector 402 comprises a measurement signal wire and a ground wire in a coaxial structure, for example.

Referring back to FIG. 3, the apparatus 112 may be attached to the crank 202 such that the apparatus twines partly around the crank such that the dimension of the apparatus from the crank towards the chains is minimized. This may be achieved by designing the shape of the casing 300 appropriately. The casing may be construed to be divided in its longitudinal direction into a first portion and a second portion separated by the dash-dotted line in FIG. 3. The first portion is connected to the protrusion 206 and is arranged to be inserted into contact with the crank 202 such that the second surface of the casing 300 comes into contact with the crank 202. The second portion may comprise the battery compartment 404 and is thus thicker than the first portion. When attached to the crank 202 and when the first portion comes into contact with the crank, the second portion twines partly around the crank. The length of the first portion along the longitudinal axis of the casing 300 may be determined by a dimension of that side of the crank 202 to which the casing is designed to be attached, i.e. the width of the crank 202 on the side where the spindle hole is. The length of the first portion may be about 25 mm, and the dimension from the centre of the protrusion 206 towards the second portion, e.g. the point where the thickness of the casing 300 starts to increase, may be at least 17 mm. This design of the casing 300 enables maintaining the dimension of the apparatus from the contact point of the second surface with the crank 202 towards the chains (in thickness dimension) preferably less than 5 mm. In some embodiments, the dimension is less than 4 mm or even 3 mm or less. Within the contact area with the crank 202, the thickness of the apparatus may designed just to sufficient to provide the apparatus with a rigid structure and to conduct the signal conductors from the protrusion 206 to the signal processing circuitry that may be located in thicker parts of the apparatus. Outside the contact area with the crank 202, the thickness may be higher provided that the thickness extends around the crank 202 in a direction away from the chains.

Figure 5:
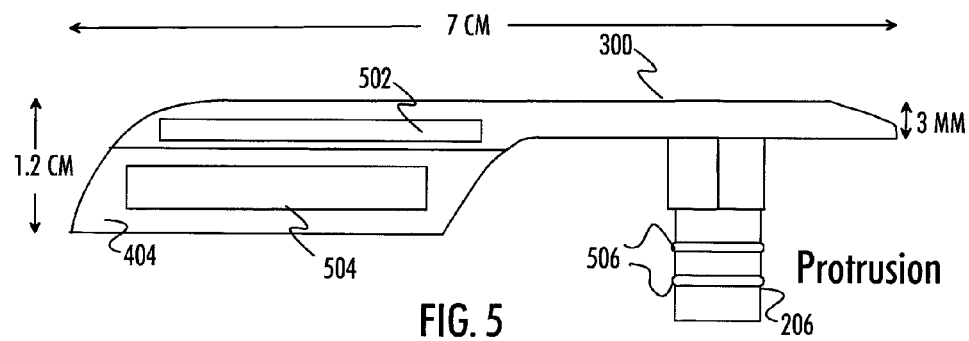

FIG. 5 illustrates another side view of the apparatus 112. The casing may comprise a cavity for the signal processing circuitry 502. The signal processing circuitry 502 may comprise at least a processor configured to process the measurement signals received from the measurement circuitry of the spindle through the electric connector in the protrusion 206. The signal processing circuitry 502 may also comprise a wireless transceiver configured to transmit the processed measurement signals to a user interface apparatus, e.g. the central unit 102. The wireless transceiver may comprise analog processing circuitries and an antenna needed for emitting wireless signals. The signal processing circuitry 502 may also comprise at least one memory storing operation parameters and computer programs defining the operations of the processor, for example. The signal processing circuitry may be arranged outside the contact area of the casing 300 with the crank 202. As shown in FIG. 5, the signal processing circuitry 502 may be confined to a location where the thickness of the casing 300 is higher than in the contact area, and signal wires may be arranged from the signal processing circuitry 502 to the electric connector 402 of the protrusion 206 through the contact area. The battery compartment 404 of the casing 300 may also be disposed in the thicker part of the casing and comprise a cavity for the battery 504 providing the signal processing circuitry 502 with power supply.

With respect to the protrusion 206, the diameter of the protrusion may be 7 mm or between 5 and 8 mm, and its length may be 14 to 20 mm, e.g. 16 mm (not including the electric pins of the electric connector 402. The protrusion 206 may comprise at least one seal which may be formed by at least one sealing member 506 providing the sealing functionality within the spindle hole. In FIG. 5, the sealing member 506 is realized by a rubber ring 506 arranged firmly around the protrusion 206. The protrusion 206 may comprise an angular depression to house the rubber ring(s) 506. The seal provides for a watertight structure, wherein the seal prevents water from entering the signal wires in the electric connector and the electric components inside the spindle. The seal may be provided in the mechanical connector 400 and/or in the electric connector 402.

As mentioned above, the first surface of the casing is substantially flat. Edges of the first surface may be bevelled, as illustrated in FIGS. 3 to 5. Particularly edges that face a tangential direction of movement of the apparatus 112 when attached to the crank 202 and used in cycling may be bevelled such that if an object hits the apparatus 112 on the bevelled edge, the impact is directed away to prevent the detachment and possible breaking of the apparatus 112. As shown in FIG. 3, the apparatus 112 is in this embodiment attached to the crank 202 such that the longitudinal axis of the apparatus 112 is aligned with the tangential direction of movement of the apparatus. In such embodiments, the ends/edges of the longitudinal axis of the apparatus 112 may be bevelled, or at least that edge that faces the main direction of movement of the pedal, e.g. pedaling forward.

Figures 6, 7:
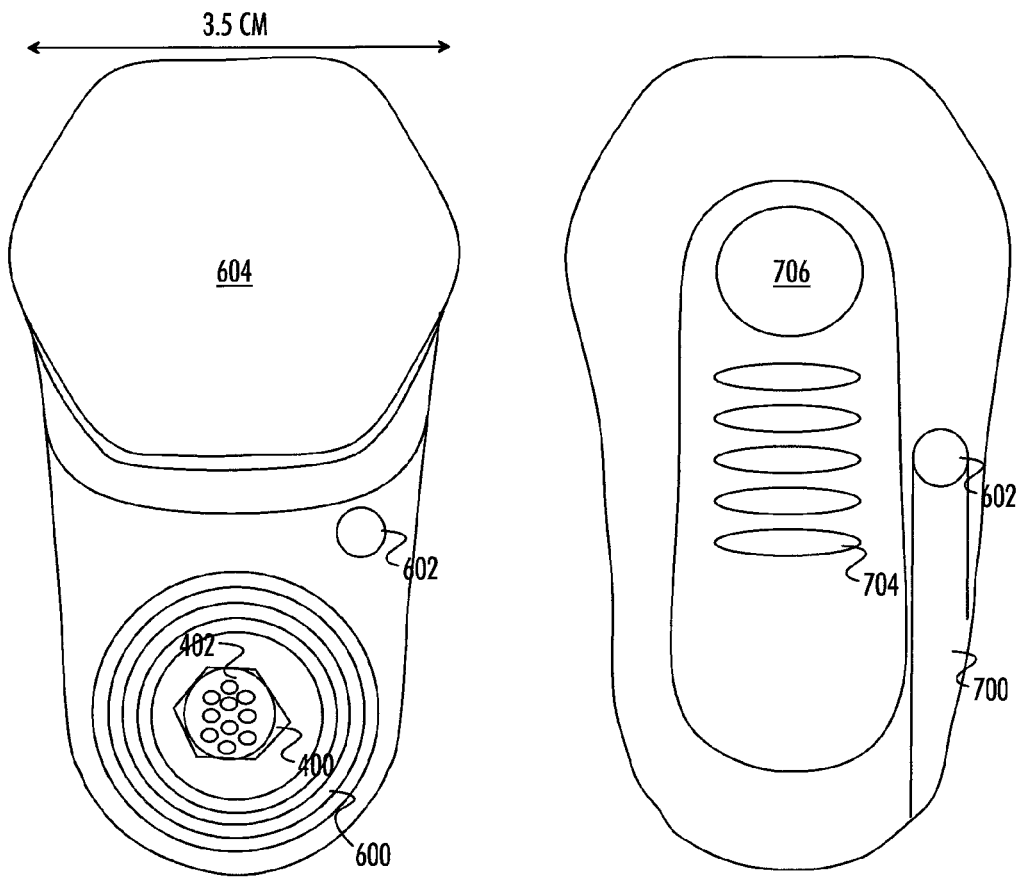

FIG. 6 illustrates the second surface of the apparatus 112. The second surface comprises the protrusion 206 which is represented in FIG. 6 by the mechanical connector 400 having a hexagonal cross-section and the electric connector 402 comprising the plurality of signal wires. On the second surface around the protrusion 206 a contact surface 600 is provided. The contact surface 600 is designed to come into contact with the crank 202 when the apparatus is attached to the crank 202. The contact surface may comprise rubber material or corresponding elastic material that may further enhance the watertight nature of the mechanic connection between the apparatus, crank, and spindle. As a consequence, the contact surface 600 may form a sealing member on the second surface of the casing 300. The contact surface 600 may be textured to comprise a plurality of rings around the protrusion 206, but the texture may have any other form as well. On top of FIG. 6, a cover 604 of the battery compartment is shown. The cover 604 may be removed by turning it to reveal the battery compartment and the battery for replacement.

A hole 602 may be provided in the thin portion of the casing for the cable tie or another binder forming binding means for attaching the apparatus 112 to the crank 202. The cable tie may be placed through the hole 602 and around the crank 202 and, with the protrusion 206 inside the hole of the spindle, fixes the apparatus 112 to the crank firmly. The cable tie fixes the apparatus to the crank in the direction in which the apparatus is placed in the spindle hole, while the protrusion fixes the apparatus 112 to the crank 202 in other directions through the mechanical support it provides.

FIG. 7 illustrates the first surface of the apparatus 112. FIG. 7 illustrates the hole 602, and a groove or a slit 700 may be arranged to the first surface, wherein the groove 700 extends from the hole 602 towards the longitudinal edge of the casing where the protrusion 206 is. The groove 700 may be used to accommodate the cable tie, and its width and depth may be arranged accordingly. The apparatus 112 may comprise a user interface comprising at least one button 706 and at least one indicator 704. FIG. 7 illustrates a plurality of indicators 704, wherein the indicators may include at least one of the following: a battery status indicator, and a currently selected crank size (e.g. length). The apparatus 112 may be configured to support installation to cranks of various lengths, and the user interface 704, 706 may be used to select the crank size. The selection then configures the operation of the signal processing circuitry 502 to process the measurement signals received from the measurement circuitry 302 accordingly, e.g. by scaling the measurement signals such that the crank size is taken into account. The indicators 704 may be used to indicate other attributes of the apparatus 112. The indicators 704 may be implemented by LEDs (Light-Emitting Diodes) or other simple light indicators, or the apparatus 112 may be provided with a high or low-resolution display, e.g. a liquid crystal display.

Figure 8:
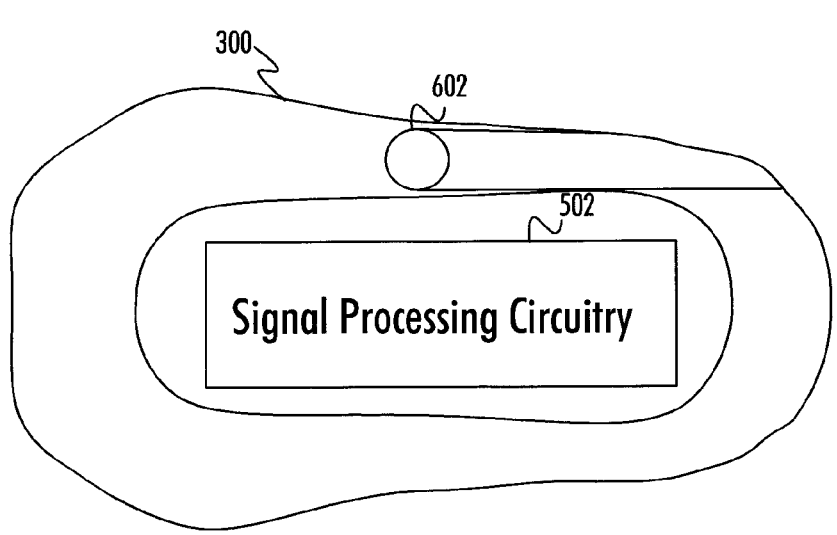

FIG. 8 illustrates another embodiment of the apparatus 112 and how the signal processing circuitry 502 is arranged inside the casing 300. The signal processing circuitry 502 may be arranged directly under the user interface such that the signal processing circuitry 502 may comprise a user interface circuitry controlling input and output of signals via the user interface. The signal processing circuitry 502 may be implemented by a single circuit board which may be a rigid or flexible circuitry board.

Above, various embodiments of the invention are described, wherein the described embodiments relate to the structure, form, and dimensions of the casing 300, different embodiments of the protrusion 206, and how components of the apparatus are disposed. It is obvious to the skilled person that the different embodiments described herein may be realized by modifying the generic concept described above in connection with FIG. 2 according to any embodiment described in connection with FIGS. 3 to 13. It will also be obvious to the person skilled in the art that, as technology advances, the inventive concept can be implemented in various ways. The invention and its embodiments are not limited to the examples described above but may vary within the scope of the claims.

The invention claimed is:

1. A pedal of a bicycle, the pedal comprising:
   a spindle comprising a hole of the spindle and a measurement circuitry including a sensor configured to measure a pedaling property and to generate a measurement signal relative to the pedaling property when the pedal is attached to a crank of the bicycle; and
   a casing, the casing comprising a signal processing circuitry configured to process the measurement signal, the casing further comprising a protrusion extending from the casing and arranged to be disposed at least partially into the hole of the spindle, wherein the protrusion provides an electric connection between the signal processing circuitry and the measurement circuitry comprised in the spindle, the casing further comprising a first portion and a second portion along a longitudinal axis of the casing, the first portion being substantially flat and connected to the protrusion, and the second portion comprising a battery compartment, wherein a thickness of the first portion is lower than a thickness of the second portion and a length of the first portion in the longitudinal direction is in the order of a width of the pedal crank, wherein the higher thickness of the second portion with respect to the first portion extends at least partially around the crank in a direction away from a chain associated with the bicycle when the casing is attached to the spindle.

2. The pedal of claim 1, wherein the second portion twines around the crank when the casing is attached to the spindle.

3. The pedal of claim 1, wherein the thickness of the first portion is less than 5 millimeters in its thinnest portion.

4. The pedal of claim 1, wherein the longitudinal axis of the casing is aligned with a tangential direction of movement of the pedal.

5. The pedal of claim 1, wherein the length of the casing is in the order of 7 centimeters.

6. The pedal of claim 1, wherein the width of the casing is between 3 and 4 centimeters.

7. The pedal of claim 1, wherein the thickness of the second portion is between 1 and 2 centimeters in the thickest portion.

8. The pedal of claim 1, wherein the first portion houses signal conductors that connect the protrusion to the signal processing circuitry.

9. A pedal of a bicycle, the pedal comprising:
   a spindle comprising a hole and a measurement circuitry including a sensor configured to measure a pedaling property and to generate a measurement signal relative to the pedaling property when the pedal is attached to a crank of the bicycle; and
   a casing, the casing comprising a signal processing circuitry configured to process the measurement signal, the casing further comprising a protrusion extending from the casing and arranged to be disposed at least partially into the hole of the spindle, wherein the protrusion comprises a plurality of pins extending from the protrusion, at least one pin being a power pin, and wherein the plurality of pins provide an electric connection between the signal processing circuitry and the measurement circuitry comprised in the spindle, and wherein the plurality of pins are springy in their longitudinal direction such that they withdraw inside the protrusion when pressed, wherein the higher thickness of the second portion with respect to the first portion extends at least partially around the crank in a direction away from a chain associated with the bicycle when the casing is attached to the spindle.

10. A pedal of a bicycle, the pedal comprising:
    a spindle comprising a hole and a measurement circuitry including a sensor configured to measure a pedaling property and to generate a measurement signal relative to the pedaling property when the pedal is attached to a crank of the bicycle; and
    a casing, the casing comprising a signal processing circuitry configured to process the measurement signal, the casing further comprising a protrusion extending from the casing and arranged to be disposed at least partially into the hole of a spindle of the pedal, wherein the protrusion provides an electric connection between the signal processing circuitry and the measurement circuitry comprised in the spindle, wherein the protrusion further comprises at least one ring-shaped depression to house a sealing member, and at least one sealing member arranged firmly in the at least one depression and around the protrusion to provide a sealing functionality within the hole of the spindle, wherein the higher thickness of the second portion with respect to the first portion extends at least partially around the crank in a direction away from a chain associated with the bicycle when the casing is attached to the spindle.

11. The pedal of claim 10, wherein the sealing member is a rubber ring.

* * * * *